United States Patent
Ben-Shalom et al.

(10) Patent No.: US 11,137,835 B2
(45) Date of Patent: Oct. 5, 2021

(54) SYSTEM AND METHODS FOR THE PROVISION AND APPLICATION OF MODULAR INTERACTIVE VISUAL DISPLAY SURFACES

(71) Applicant: TAKARO TECH LTD., Herzliya (IL)

(72) Inventors: Amir Ben-Shalom, Modiin (IL); Ofer Atir, Herzliya (IL)

(73) Assignee: TAKARO TECH LTD., Kibutz Glilyam (IL)

( * ) Notice: Subject to any disclaimer, the term of this patent is extended or adjusted under 35 U.S.C. 154(b) by 123 days.

(21) Appl. No.: 16/497,803

(22) PCT Filed: Dec. 13, 2018

(86) PCT No.: PCT/IB2018/059990
§ 371 (c)(1),
(2) Date: Sep. 26, 2019

(87) PCT Pub. No.: WO2019/116290
PCT Pub. Date: Jun. 20, 2019

(65) Prior Publication Data
US 2020/0225767 A1    Jul. 16, 2020

Related U.S. Application Data

(60) Provisional application No. 62/669,402, filed on May 10, 2018, provisional application No. 62/669,404, filed on May 10, 2018, provisional application No. 62/668,976, filed on May 9, 2018, provisional application No. 62/619,837, filed on Jan. 21, 2018,
(Continued)

(51) Int. Cl.
*G06F 3/03* (2006.01)
*A63F 13/214* (2014.01)
*G06F 3/147* (2006.01)

(52) U.S. Cl.
CPC .......... *G06F 3/0308* (2013.01); *A63F 13/214* (2014.09); *G06F 3/0325* (2013.01); *G06F 3/147* (2013.01)

(58) Field of Classification Search
CPC ...... G06F 3/0308; G06F 3/0325; G06F 3/147; A63F 13/214
See application file for complete search history.

(56) References Cited

U.S. PATENT DOCUMENTS 5,539,550 A * 7/1996 Spitzer ................. H04N 9/3141
349/42
7,924,272 B2    4/2011 Boer et al.
(Continued)

FOREIGN PATENT DOCUMENTS

WO    2017/216795 A1    12/2017

*Primary Examiner* — Ariel A Balaoing
(74) *Attorney, Agent, or Firm* — Alphapatent Associates Ltd.; Daniel J. Swirsky

(57) ABSTRACT

A modular interactive visual display platform including interconnecting modules including tile modules forming a visual display sensing surface which generates graphical images and senses object proximate to the surface. Tile connector interfaces use tricoupling mechanisms including a mechanical connector, a power connector and a communication connector to connect modules together. The visual display sensing surface may include integrated addressable LEDs, proximity sensors and pressure sensors.

3 Claims, 9 Drawing Sheets

Related U.S. Application Data provisional application No. 62/598,233, filed on Dec. 13, 2017.

(56) References Cited

U.S. PATENT DOCUMENTS

| | | |
|---|---|---|
| 8,215,642 B2 | 7/2012 | Macura et al. |
| 8,833,007 B2 | 9/2014 | Tillery et al. |
| 9,767,613 B1 * | 9/2017 | Bedikian ............. G06F 3/04845 |
| 2002/0071247 A1 * | 6/2002 | Clark .................... G06F 3/1446 361/679.21 |
| 2002/0186956 A1 * | 12/2002 | Lowry ................... G09F 9/305 385/147 |
| 2005/0116667 A1 * | 6/2005 | Mueller ................. G09F 19/22 315/312 |
| 2008/0048880 A1 * | 2/2008 | Strickland .............. G09F 19/22 340/815.4 |
| 2011/0050640 A1 * | 3/2011 | Lundback ............. G06F 3/0488 345/175 |
| 2011/0102300 A1 * | 5/2011 | Wood .................... G06F 3/1446 345/1.3 |
| 2011/0234493 A1 * | 9/2011 | Kravits ............... G06F 3/03547 345/160 |
| 2012/0139897 A1 * | 6/2012 | Butler .................... H04N 13/31 345/419 |
| 2013/0181901 A1 * | 7/2013 | West ........................ G09G 5/14 345/161 |
| 2014/0008203 A1 | 1/2014 | Nathan et al. |
| 2015/0301643 A1 | 10/2015 | Hafidh et al. |
| 2020/0225903 A1 * | 7/2020 | Cohen .................. G06F 3/1446 |

\* cited by examiner

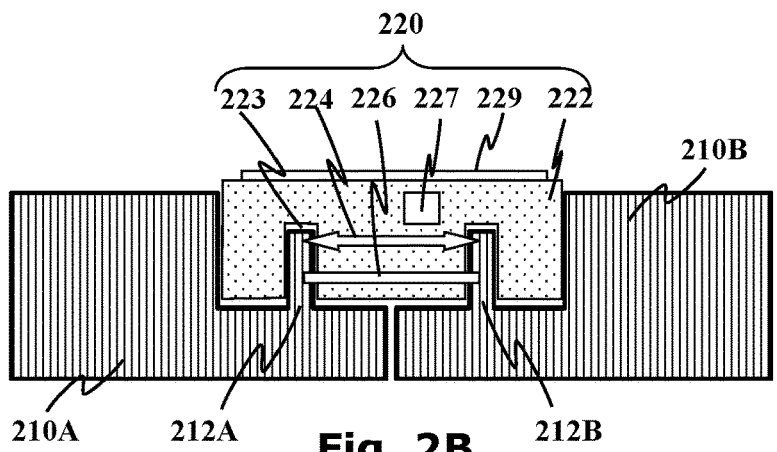
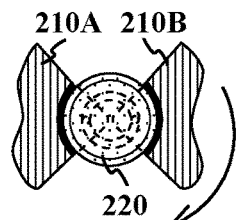
Fig. 2B
Fig. 2D
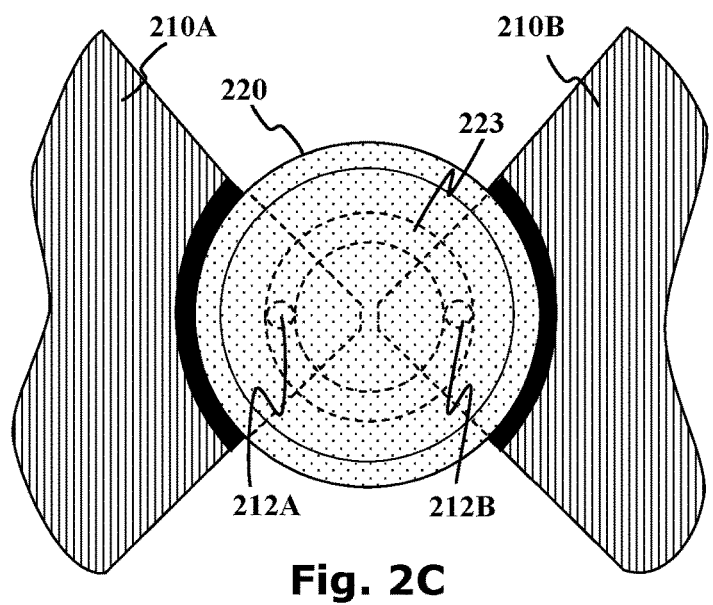
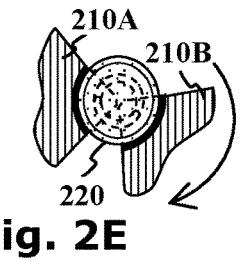
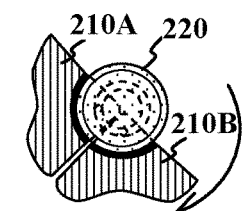
Fig. 2C
Fig. 2E
Fig. 2F
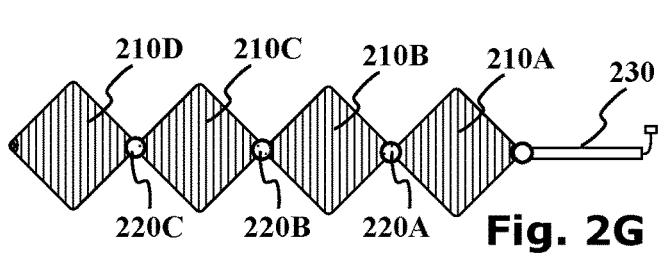
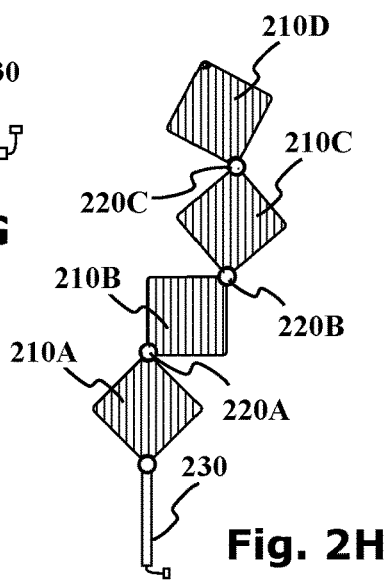
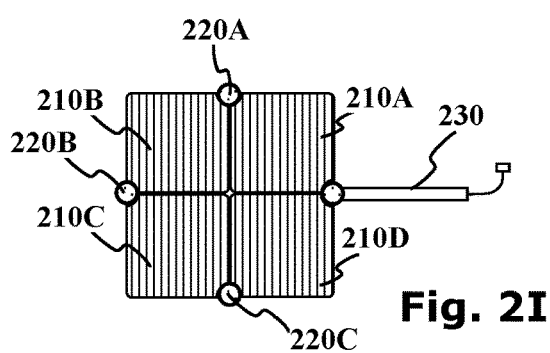
Fig. 2G
Fig. 2H
Fig. 2I

Fig. 4A  Fig. 4B

SYSTEM AND METHODS FOR THE PROVISION AND APPLICATION OF MODULAR INTERACTIVE VISUAL DISPLAY SURFACES

CROSS-REFERENCE TO RELATED APPLICATIONS

This application is a U.S. National Phase Application under 35 U.S.C. 371 of International Application No. PCT/IB2018/059990, which has an international filing date of Dec. 13, 2018, and which claims priority and benefit from U.S. Provisional Patent Application No. 62/598,233, filed Dec. 13, 2017; U.S. Provisional Patent Application No. 62/619,837, filed Jan. 21, 2018; U.S. Provisional Patent Application No. 62/668,976, filed May 9, 2018; U.S. Provisional Patent Application No. 62/669,402, filed May 10, 2018; and U.S. Provisional Patent Application No. 62/669,404, filed May 10, 2018, the contents and disclosures of all of which are incorporated herein by reference in their entirety.

FIELD AND BACKGROUND OF THE DISCLOSURE

The disclosure herein relates to systems and methods for the provision and application of interactive visual display surfaces.

The applicant's copending International Patent Application Publication No. WO2017/216795 describes interactive visual display surfaces which may be networked to each other and to a computer.

The need remains however for a modular interactive visual display surfaces.

SUMMARY OF THE INVENTION

It is one aspect of the current invention to present a modular interactive visual display platform including at least one tile module, and at least one power module.

The at least one tile module may comprise at least one visual display sensing surface comprising a display mechanism and a sensing mechanism, the display mechanism operable to generate and to display graphical images and the sensing mechanism operable to sense at least one parameter associated with at least one object proximate to the surface.

The at least one tile connector interface may comprise a tricoupling mechanism comprising a mechanical connector, a power connector and a communication connector for coupling the tile connector to a corresponding tricoupling mechanism of at least one other module.

The at least one power module may comprise at least one power supply connector for connecting to an external power source.

The modular interactive visual display platform may further include at least one tile connector terminal comprising at least a power connector for coupling with a corresponding power connector of a tricoupling mechanism of another module.

Where appropriate, the tile module comprises a master tile module further comprising a central processing unit for controlling the visual display sensing surface and a communication unit for communicating with satellite modules.

Additionally or alternatively, the modular interactive visual display platform further comprises at least one connector module for interconnecting a first module with a second module. The connector module comprises at least one tricoupling mechanism for coupling the connector module to at least a first corresponding tricoupling mechanisms of the first module with a second corresponding tricoupling mechanisms of the second module; at least one communication bridge providing a communication line between a first communication connector of the first tricoupling mechanism with a second communication connector of the second tricoupling mechanism; at least one power bridge providing a power line between a first communication connector of the first tricoupling mechanism with a second communication connector of the second tricoupling mechanism; and a mechanical connector for mechanically connecting the first tricoupling mechanism to the second tricoupling mechanism. Optionally, the connector module further comprises an interactive sensing surface. Optionally, the connector module further comprises a central processing unit for controlling the visual display sensing surface. Optionally, the connector module further comprises a communication unit. Optionally, the connector module further comprises a microcontrolling unit for monitoring configuration of connected modules. Optionally, the connector module further comprises an angle sensor configured and operable to detect the angles at which the first module and the second module are connected.

In other aspects of the invention, the at least one visual display sensing surface comprises an array of proximity sensors, the proximity sensors comprising at least one integrated circuit, at least one red light emitting diode, at least one green light emitting diode, at least one blue light emitting diode, and at least one infra-red sensitive phototransistor, wherein the at least one infra-red sensitive phototransistor is operable to detect IR radiation reflected thereupon by objects proximate thereto. Optionally, the at least one red light emitting diode is selected to have a frequency emission range extending into the infra-red spectrum and operable to emit IR radiation detectable by the at least one infra-red sensitive phototransistor. Additionally or alternatively, the proximity sensor further comprises at least one infra-red light emitting diode operable to emit IR radiation detectable by the at least one infra-red sensitive phototransistor.

In still other aspects of the invention, the at least one visual display sensing surface comprises a conducting surface, a state detector, and an array of addressable pressure sensing units, wherein: each addressable pressure sensing unit comprises an addressable LED, an integrated circuit, a data-in line, a data-out line, and a contact sensor switchable between logic state ZERO to logic state ONE. The conducting surface is configured to make conductive contact with a contact sensor only when pressure is applied thereto. The integrated circuit is configured to receive digital signals via the data-in line including a first data package including operating instructions for the contact sensor, and a second data package for transferring via the data-out line. The state detector is operable to detect a change from state ZERO to state ONE when an addressable contact sensor is both activated to logic state ZERO and is in contact with the conducting surface. Accordingly, the state detector may be operable to detect local pressure applied to the conductive surface in the region of an activated contact sensor.

Additionally or alternatively, the at least one visual display sensing surface comprises a conducting surface, a state detector, and an array of addressable environment interface pixels. Each addressable environment interface pixel comprises an environmental output interface configured to present an output signal according to digital data received via a digital data input line, and an environmental input sensing unit configured to generate a digital output according to environmental conditions sensed thereby. Optionally, the array of addressable environment interface pixels comprises a controller configured to provide an input data signal to a first pixel in the array and to receive the output data from a terminal pixel of the array. Optionally, the array of addressable environment interface pixels comprises a combination of environment interface pixels selected operable to detect environmental parameters via sensors selected from sensors, proximity sensors, pressure sensors and temperature sensors.

Where appropriate, the array of environmental interface pixels is operable to receive a first input data signal comprising a string of input message packets followed by a marker indicating an end of the string; and each environmental interface pixel is operable to receive an input data signal, to execute instructions coded in the input message packet, to detect an environmental parameter, to determine an output of an environmental output interface, and to generate a digital output signal which is passed to a next environmental interface pixel.

Optionally, the modular interactive visual display platform includes a skirt perimeter configured to appear continuous with the surrounding flooring.

Furthermore, the modular interactive visual display platform may further comprise a connector strip module comprising: a first terminal tricoupling mechanism connector; a second terminal tricoupling mechanism connector; a communication bridge providing a communication line between a first communication connector of the first tricoupling mechanism with a second communication connector of the second tricoupling mechanism power lines; and a power bridge providing a power line between a first communication connector of the first tricoupling mechanism with a second communication connector of the second tricoupling mechanism; a first mechanical connector for mechanically connecting the first tricoupling mechanism to a corresponding tricoupling mechanism of another module; and a second mechanical connector for mechanically connecting the second tricoupling mechanism to a corresponding tricoupling mechanism of another module.

Additionally or alternatively, the modular interactive visual display platform may further comprise a connector blanket module comprising: at least at least four terminal tricoupling mechanism terminals; a connecting material; a communication bridge embedded in the connecting material and providing a communication line between communication connectors of the tricoupling mechanism terminals; and a power bridge embedded in the connecting material and providing a power line between communication connectors of the tricoupling mechanism terminals.

In still other aspects of the invention, a method is taught for providing an interactive visual display sensing platform, the method comprising: obtaining at least two tile modules, each comprising a display mechanism and a sensing mechanism and at least one tile connector interface; obtaining at least one connector module comprising at least two tile connector interface, a power bridge, and a communication bridge; connecting the at least two tile modules via the at least one connector module comprising a communication bridge; a central processing unit generating a graphical display control signal; communicating the graphical display control signal to at least one the display mechanism via the communication bridge of the connector module; said at least one said display mechanism displaying graphical images according to the graphical display control signal; at least one the sensing mechanism sensing at least one parameter associated with at least one object proximate to the surface; and communicating the at least one parameter sensed by said at least one the sensing mechanism said via the communication bridge of said connector module to the central processing unit.

Where the sensing mechanism comprises a conducting surface, a state detector in conductive contact with the conducting surface, and an array of addressable pressure sensing units, the step of at least one said sensing mechanism sensing at least one parameter may comprise: setting at least one addressable sensing units to a logic state ZERO at a known time; the conducting surface contacting the at least one addressable sensing units; and the state detector detecting state ZERO at the known time.

Additionally or alternatively, where the sensing mechanism comprises an array of proximity sensors, the proximity sensors comprising at least one integrated circuit, at least one red light emitting diode, at least one green light emitting diode, at least one blue light emitting diode, and at least one infra-red sensitive phototransistor, wherein the method may comprise the at least one infra-red sensitive phototransistor detecting infra-red radiation reflected thereupon by objects proximate thereto.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 2B and 2C schematically represent a section through and a top view of a connector module connecting two tile modules;

FIGS. 2D-F show various angular configurations of the tiling modules and the connector module;

FIGS. 2G-I schematically illustrate how an exemplary set of four tile modules, three connector modules and a power connector may be configured in three different ways to provide various configurations of extended interactive platforms;

FIGS. 4A-D schematically represent addressable LED units which may be incorporated into the visual display surface;

DETAILED DESCRIPTION

Figure 1A:
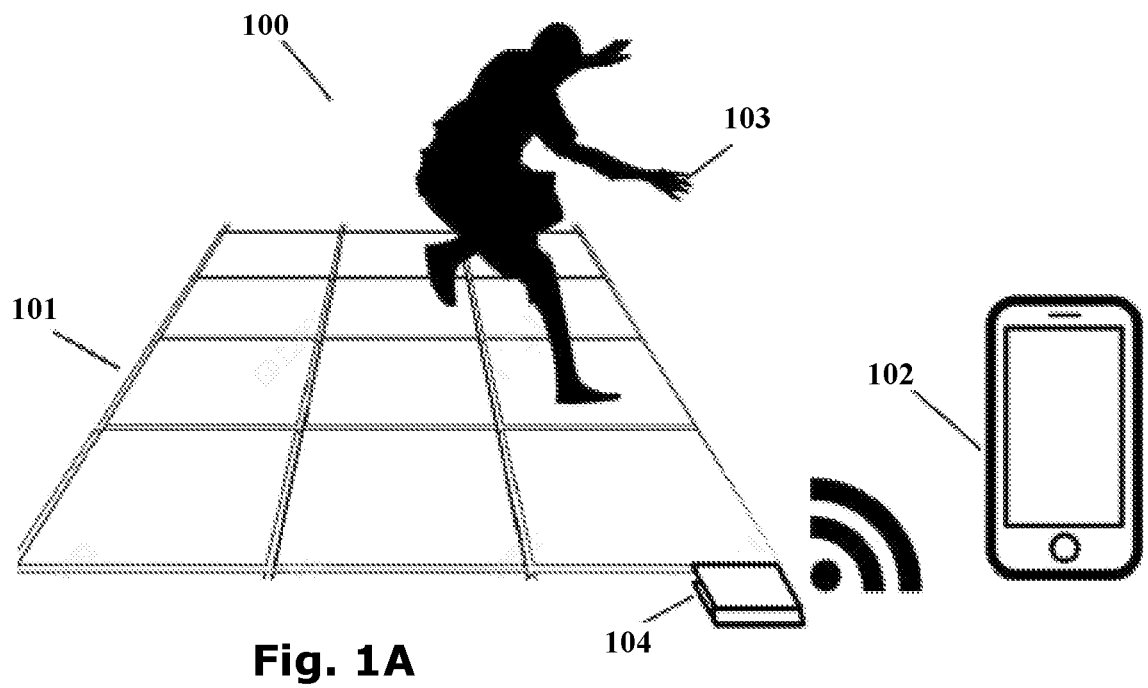
FIG. 1A is schematic representation of an interactive visual display surface of the current disclosure.

Aspects of the present disclosure relate to systems and methods for the production and application of interactive visual display surfaces.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

DESCRIPTION OF THE EMBODIMENTS

The present invention provides an interactive system comprising: at least one interactive visual display surface; at least one interactive computer being interconnected to said surface comprising an operating system; wherein said at least one surface is configured to sense at least one parameter of at least one object on said surface; send to said at least one interactive computer, at least one digital input data based on said at least one parameter; receive at least one digital output data from said at least one interactive computer; and wherein said at least one digital output data comprises at least one graphical information; and display said at least one graphical information on said at least one interactive surface; wherein said at least one parameter is selected from impact of said object on said surface, location of object on said surface, velocity of object on said surface, heat of object on said surface, height of object from said surface and any combination thereof.

The term "interactive system" should be understood to encompass a system being in coordinated interaction with at least one user operating it, at least one interactive visual display surface and at least one interactive computer and any communications.

The term "interactive visual display surface" should be understood to encompass any surface that is capable of displaying an interface that is received from the at least one interactive computer and is capable of sensing at least one parameter of an object placed on said surface, comprising impact of said object on said surface, velocity of object on said surface, heat of object on said surface, location of object on said surface, height of object from said surface and any combination thereof. The surface can send to said at least one interactive computer, at least one digital input data based on said at least one parameter; receive at least one digital output data from said at least one interactive computer; and wherein said at least one digital output data comprises at least one graphical information; and display said at least one graphical information on said at least one interactive surface.

In some embodiments, said interactive visual display surface is connected directly to the internet (using any type of communication technology such as for example Wi-Fi technology, Bluetooth technology and so forth).

In some further embodiments said interactive visual display surface is an assembly of two and more (at least two) visual display surfaces interconnected between them to provide a uniform display surface, connectively displaying said graphical information. Under these embodiments, said at least two interactive visual display surfaces provide together the entire graphical information.

The term "object" should be understood to encompass any three-dimensional object that is placed on said surface and can create at least one parameter sensed by said surface. Said object may be a still object moved by the user on the surface of said system. In other embodiments said object is the body of the user himself that is moving on the surface of said system.

Said at least one interactive surface comprises at least one sensor configured to sense said at least one parameter of at least one object on said surface. In some embodiments said at least one sensor is an electrooptic sensor (in some embodiments said sensor can detect the difference in light shade and/or light intensity on said interactive surface and thus detect a parameter of said object on said surface, such as for example the location of said object, the velocity of said object and so forth). In some further embodiments said sensor is embedded and/or integrated within said interactive surface.

Said at least one interactive surface sends to said at least one interactive computer, at least one digital input data based on said at least one parameter, after which it receives at least one digital output data including at least one graphical information, from said at least one interactive computer. The interactive surface then displays said at least one graphical information.

Said user interaction includes, but is not limited to any type of parameter of the user on said at least one interactive visual display surface as for example impact, location of object on said surface, velocity, heat, height and so forth and any combination thereof. Said at least one interactive visual display surface is configured to sense at least one parameter on said surface thereby sending to said at least one interactive computer at least one digital input data based on said at least one parameter.

Said at least one interactive visual display surface receives at least one digital output data from said at least one interactive computer which comprises at least one graphical information being displayed as an at least one graphical information on said at least one interactive surface.

In some embodiments, said interactive computer can further receive input from at least two interactive visual display surfaces.

In further embodiments, said at least one output data further comprises at least one audio signal information.

In other embodiments, said at least one interactive surface comprises a capacitive multi-touch LED display surface or any other type of display technology.

In further embodiments, said at least one interactive computer is also connected to the web network. In some other embodiments, at least one interactive computer is selected from a hand-held computer, a portable computer, a stationary computer, a cell phone, a tablet computer, a game console or any combinations thereof.

In other embodiments, said at least one interactive surface and/or at least one interactive computer comprises at least one transponder. Said transponder is capable of transmitting information between at least one interactive surface and at least one interactive computer.

In other embodiments, said operating system on said at least one interactive computer is programmed to provide an interactive CGI display on said at least one interactive visual display. In other embodiments, said program providing an interactive CGI display on said at least one interactive visual display is a computer game program.

In other embodiments, said program providing an interactive CGI display on said at least one interactive visual display is a computer interactive program.

In further embodiments, said at least one interactive visual display surface is placed on the ground.

In other embodiments, said system comprises at least two interactive visual display surfaces. In further embodiments, said at least two interactive visual display surfaces are perpendicular to each other.

In some other embodiments, said at least one interactive visual display surface has the size of at least about 0.40 m×0.40 m.

In further embodiments, said at least one interactive visual display surface has the size of at least about 1 m×2 m.

In further embodiments, said at least one interactive visual display surface module can be connected to one or more interactive visual display surface to establish a bigger surface.

In another aspect, the invention provides a method of operating an interactive program with at least one user; said method comprises: providing an interactive system comprising at least one interactive visual display surface; at least one interactive computer being interconnected to said surface comprising an operating system; wherein said at least one surface is configured to sense at least one parameter; send to said at least one interactive computer, at least one digital input data based on said at least one parameter; receive at least one digital output data from said at least one interactive computer; wherein said at least one digital output data comprises at least one graphical information; and display said at least one graphical information through said at least one interactive surface; displaying on said interactive surface an interactive graphical display created by said operating system of said at least one interactive computer; sensing at least one parameter of at least one user by said at least one interactive surface and any parameters thereof; generating at least one digital input data based on said at least one parameter and parameters thereof; sending at least one digital input data to said at least one interactive computer; generating at least one digital output data by said operating system on said at least one interactive computer; sending said at least one digital output data from said interactive computer to said at least one interactive surface; displaying graphically using said interactive graphical display on said interactive surface said at least one digital output data on said interactive surface.

FIG. 1A is a schematic embodiment of an interactive system of the invention. The system of FIG. 1 100 comprises an interactive visual display surface 101; an interactive mobile computer 102 both being interconnected to each other using an operating system and at least one transponder 104. The surface 101 is configured to sense at least one parameter on said surface by a user 103 stepping or touching it, then sending to said interactive computer at least one digital input data based on said at least one parameter. The computer 102 generates at least one digital output data which is received by said surface which is translated to at least one graphical information displayed on said interactive surface.

Figure 1B:
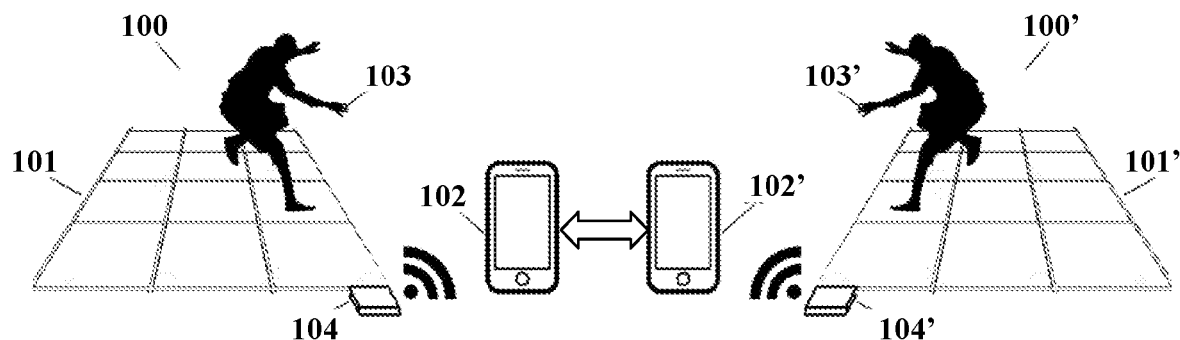
FIG. 1B is a schematic representation illustrating a networked pair of interactive of a visual display surface of the current disclosure.

FIG. 1B depicts another embodiment of a system of the invention, which comprises two interactive visual display surfaces 100 and 100; two interactive mobile computers 102 and 102' each being interconnected to the each other using an operating system and at least one transponder 104 and 104' for each. The surfaces 100 and 100' are configured to sense at least one parameter on said corresponding surface by two individual users 103 and 103' stepping or touching each corresponding, then each sending to said interactive computer at least one digital input data based on said at least one parameter of both users. The computers 102 and 102' generate at least one digital output data which is received by both surfaces which is translated to at least one graphical information displayed on both interactive surfaces.

In other embodiments, the interactive platform may be a modular system including at least one master tile which may optionally be combined with one or more interactive accessory modules in order to provide additional functionality as required.

Accordingly the interactive platform may provide varying functionality depending upon the number and combination of modules used.

According to certain embodiments, the master tile module may provide a platform, say a square about 80 centimeters by 80 centimeters or thereabouts which may support a number of features including: a ceiling light reflection feature, programmable music and sounds effects, an internal alarm clock, an auto-shutdown allowing the platform to turn itself off under predetermined conditions such as after a certain amount of time. The master tile may allow the concurrent sensing of pressures and proximity allowing the user to interact with the platform via touch, for example by hands or feet. The master tile may further allow users to select required indications to setup sleep-time ambiance and wake-up modes.

Furthermore the master tile may include operational components, such as speakers, central processing unit (CPU), and power units. The master tile may also include a communication unit allowing the master to that the master may interact with satellite accessories via a communication protocol such as Bluetooth, Low energy Bluetooth, WiFi, Zigbee or any other required communication protocol as required.

The platform may function as a bedroom companion for example allowing a user to set light levels for example a dim light inducing a relaxing atmosphere to make it easier for a subject in the room to fall asleep. Likewise, in the morning, the platform may transform into an interactive engaging alarm clock, possibly waking the user up by name or with music and even requiring them to step on the platform and interact with it to turn off the alarm. Where required, until a certain action is performed, catching a moving light signal, for example, the platform may increase its volume, making sure the user is standing before ending the alarm.

Optionally, different wake-up activities may be required to turn off the alarm each morning and may be derived from the various games such as a morning network in which remote users may contact each other. For example, a morning wakeup games may be initiated by a friend. One user may be prompted to compete with a second user to encourage the users to wake up. It is particularly noted that this novel and inventive wake-up approach, involving users contacting each other may be particularly useful in the juvenile market where the state of the art is generally represented by nagging adults.

The master tile module may provide the first building block in the modular interactive platform. More specialized satellite accessory modules may be retrofitted to the master tile to enrich the platform's content, games and accessories.

Accordingly, the master tile may be operable to detect the number of satellite accessories to which it may connect and adapt the number and nature of the games accordingly.

Figure 2A:
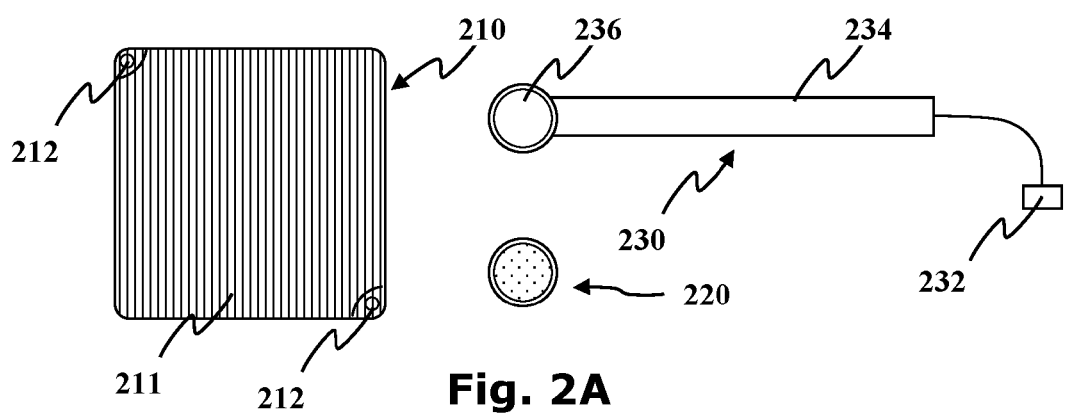
FIG. 2A illustrating possible modules which may be combined into an extended interactive platform.

Reference is now made to FIG. 2A illustrating possible modules which may be combined into an extended interactive platform. The possible modules include for example a tile module 210 providing the interactive surface, a connector module 220 for connecting modules together, and a power module 230 for providing power to the system.

The tile module 210 includes an interactive visual display sensing surface 211, and at least one tile connector interface 212. In some embodiments the tile module may be quadrangular with tile connector interfaces 212 provided at the corners, where appropriate two tile connector interfaces 212 are provided at two diagonally opposing corners of the module 210.

Where appropriate the tile connector interface may comprise a tricoupling mechanism comprising a mechanical connector, a power connector and a communication connector for coupling with other modules.

The power module 230 includes a power connector 232, a sturdy strip connector 234 and a tile connector terminal 236. The power supply connector 232 is provided for connecting the system to a mains line or a transformer thereby providing power at a voltage and current suitable for the electronics of the tile modules to function.

The connector module 220 is provided to interconnect the various modules. Where appropriate the connector module includes at least one tricoupling mechanism comprising a mechanical connector, a power connector and a communication connector for coupling with other modules. Accordingly, the connector module 220 is configured and operable to provide a physical connection alongside a power connection and a communication line between individual modules.

Reference is now made to FIGS. 2A and 2B which schematically show a section through and a top view of a connector module 220 providing a tricoupling mechanism for connecting two tile modules 210B. The connector module 220 includes a body 222, a communication bridge 224 providing a communication line between at least two communication connectors, a power bridge 224 providing a power line between at least two power connectors, and at least one mechanical connector 223.

The mechanical connector 223 is configured to physically connect with at least one tile connector interface 212A, 212B of the tile modules 210A, 210B. The mechanical connector 223 may include a socket for snugly accommodating a connecting pin of the tile connector interface 212A, 212B. Where appropriate, the tricoupling mechanism may include a circular channel 223 into which two connecting pins may be simultaneously and rotatably connected. In still other embodiments, multiple tricoupling mechanisms may be provided at various angles around the connecting module 220 such that the tile modules 212 may be connected at various angles.

FIGS. 2D-F illustrate how the connecting module 220 may be used to connect tile modules at various angles. In some embodiments, the connecting modules 220 may further include an angle sensor configured and operable to detect the angle at which the connecting tile modules are connected.

Referring now to FIGS. 2G-H, it is particularly noted that a particular set of modules may include, for example four tile modules 210A-D, three connector modules 220A-C and a power connector 230. This basic set may be configured in various ways due to the versatility of the coupling mechanism between the connector modules 220 and the tile connector interfaces 212. For the purposes of illustration only, three different configurations of the extended interactive platform are represented in FIGS. 2G-H.

Referring back to FIG. 2C, it is further noted that the connection module may further include a microcontrolling unit 227. The microcontrolling unit 227 may provide monitoring of the configuration, nature and identity of the modules connected to the connection module as well as provide a communication channel such as described above.

Where required the connecting unit 220 itself may provide additional functionality such as an interactive sensing surface 229, speakers, visual projectors or the like which may be integrated into games as required.

Referring now to FIGS. 2G-H, it is particularly noted that a particular set of modules may include, for example four tile modules 210A-D, three connector modules 220A-C and a power connector 230. This basic set may be configured in various ways due to the versatility of the coupling mechanism between the connector modules 220 and the tile connector interfaces 212. For the purposes of illustration only, three different configurations of the extended interactive platform are represented in FIGS. 2G-I.

Figure 2K:
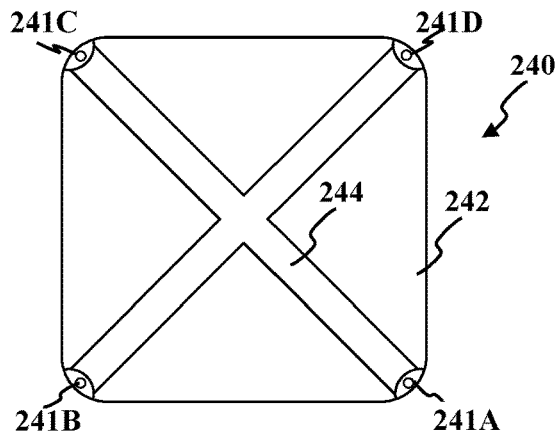
FIG. 2K illustrates how four tile modules may be connected to a single blanket connector.
Figure 2K:
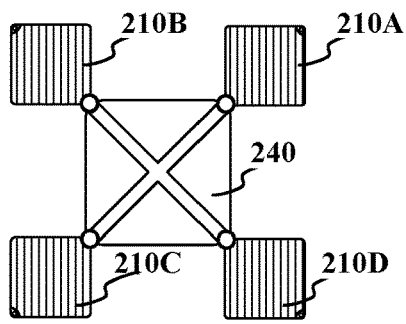
Figure 2J:
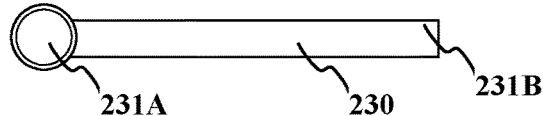
FIG. 2J schematically shows additional connecting modules which may be used with the interactive surface.

Referring now to FIG. 2J, additional modules may be provided for further extending the functionality of the interactive platform. These include a connecting blanket 242 and a connecting strip 230.

The connecting blanket 240 may provide a connecting material 242 within which power lines and communication lines may be provided in strips 244 connecting between multiple modules. For example four tricoupling mechanism connectors 241A-D may be arranged at the corners. The connecting strip 230 may provide both power lines and communication lines between two tricoupling mechanism connectors 231A, 231B.

The connecting blanket 240 may be connected to multiple tile modules such as illustrated in FIG. 2K showing four tile modules 210A-D each connected to a corner of the connecting blanket. It is further noted that the connection blanket 240 may optionally include a monitors for recording the configuration, nature and identity of the modules connected to the connection blanket as well as to provide a communication channel such as described above.

Figure 2L:
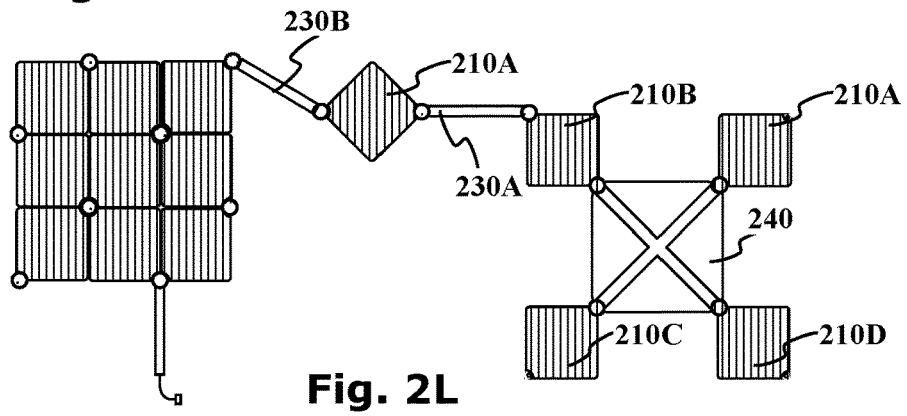
FIG. 2L shows an exemplary extended configuration for the interactive surface platform.

It will be appreciated that various modules may be combined into an extended surface such as illustrated in FIG. 2L as required.

In various examples of the interactive platform a surface may be provided with proximity sensing devices operable to detect an object nearby. For example, proximity sensing hardware devices may comprise at least one RGB LED illuminator; at least one independent IR led with photoresistor or wide range IR led emitting in the IR range; at least one IC (Integrated Circuit) managing the RGB illumination, controlling the operation of the IR and range sensor; The described device may be incorporated into electronic circuits and may include a communication bus providing a bi-directional protocol and/or allowing daisy chaining of multiple devices. The method of operation consists of individually addressing a device instance for setting a specific RGB combination which will result in the device visually displaying the set color or reading a distance measurement from the device being addressed.

The device may include red, green and blue LEDs combined with an independent IR (Infra-red spectrum) LED, a phototransistor that is able to measure IR radiation and their controlling IC. Alternatively or additionally, the proximity sensing device may include a green LED, a blue LED and a red LED having a wide range emission spectrum such that it emits in both of the IR and visible ranges, as well as the IR sensitive phototransistor and their controlling IC. It is noted that the wide range spectrum red LED enables the control of the red spectrum emitting frequencies, between the visible red ranges and the IR spectrum ranges as required.

The device may further include an IC managing the RGB illumination, controlling the operation of the range sensor, providing addressing and communication, and if a wide spectrum red LED is used timing (frequency) to switch between the visible spectrum RGB illumination and IR spectrum distance detection.

Figure 3A:
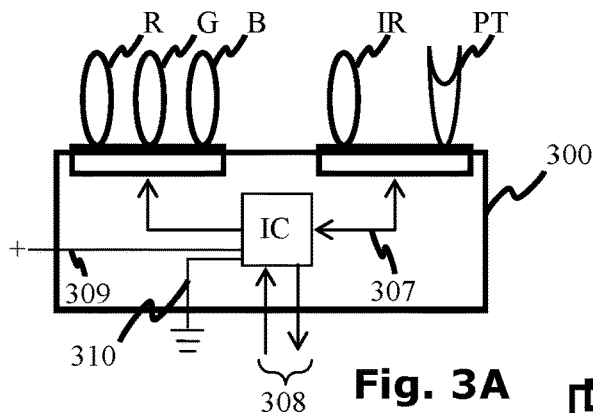
FIGS. 3A and 3B show illustrations of an embodiment of proximity sensing hardware devices.

FIG. 3A is a schematic embodiment of a proximity sensing hardware device 300. The hardware device 300 comprises a blue LED B a green LED G; a red LED R. The RGB LEDs color and intensity are controlled by the embedded integrated circuit (IC). The hardware device 300 comprises also a Infra-Red spectrum LED IR; an IR sensitive phototransistor PT operable to measure IR radiation; The IR LED radiation and span is controlled via line connection 307 by the embedded integrated circuit (IC). The IR sensitive phototransistor PT measurements of the IR radiation via line connection 307 is readable by the integrated circuit IC. The integrated circuit IC is connected via lines 308 that provides bi-directional communication that allows also daisy chaining of multiple devices. The integrated circuit IC allows individually to address a specific device instance for setting specific RGB combination, and/or reading distance measurement from the specific instance device being addressed 305. Common power supply line 309; Common ground line 310.

Figure 3B:
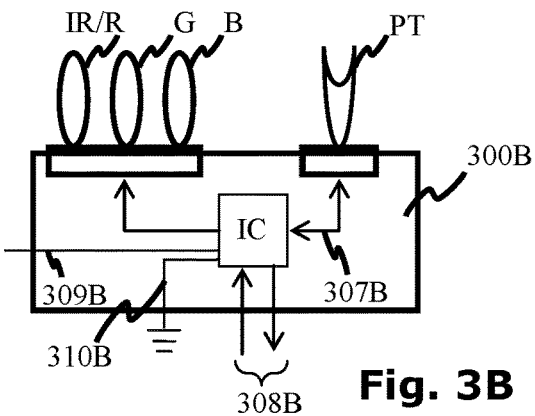

FIG. 3B depicts another embodiment of the proximity detecting hardware device in its optimized configuration of the invention. The hardware device of FIG. 4 300B comprises a blue LED B; a green LED G; a wide range red spectrum LED IR/R capable of emitting both in the IR spectrum and the visible red spectrum. The RGB LEDs color and intensity are controlled by the embedded integrated circuit (IC). The wide range spectrum red LED IR/R is controlled by the integrated circuit IC also for switching between the visible red spectrum and the IR red spectrum at a controlled frequency. The hardware device 300B comprises also an IR sensitive phototransistor that able to measure IR radiation PT; The wide range spectrum LED IR/R radiation, intensity, duration and frequency is controlled by the embedded integrated circuit (IC). The IR sensitive phototransistor PT measurements of the IR radiation are communicated via a line connection 307B and are readable by the integrated circuit IC; The integrated circuit IC is connected via lines 308B that provides bi-directional communication that allows also daisy chaining of multiple proximity detecting devices. The integrated circuit IC allows individually to address a specific device instance for setting specific RGB combination, and IR radiation, and/or reading distance measurement from the specific instance device being addressed. Common power supply line 309B; Common ground line 310B.

Referring now to FIG. 4A an addressable RGB LED unit 400A including a red LED R, a green LED G and a blue LED B, an integrated circuit IC, a data-in line Din and a data-out line Dout. The integrated circuit is configured to receive digital signals via the data-in line including a first data package including three channels providing operating instructions for each of the three LEDs and a second data package for transferring via the Dout line.

Referring now to FIG. 4B an alternative addressable RGBW LED unit 400B including a red LED R, a green LED G, a blue LED B and also a white LED W. The RGBW LED also includes an integrated circuit IC configured to receive digital signals via a data-in line including a first data package including channels providing operating instructions for each of the four LEDs and a second data package for transferring via the Dout line.

Figure 4C:
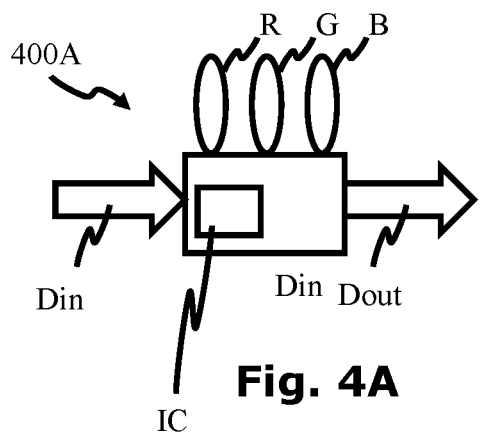
Figure 4C:
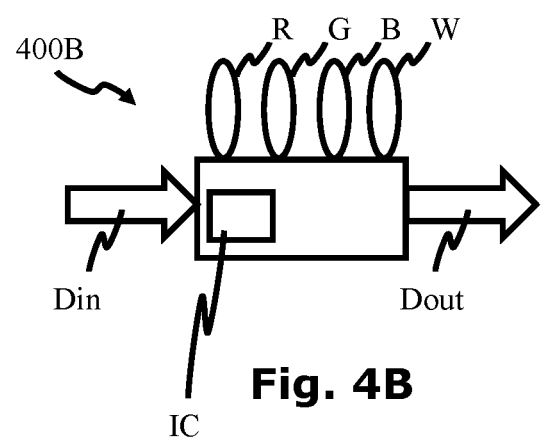
Figure 4C:
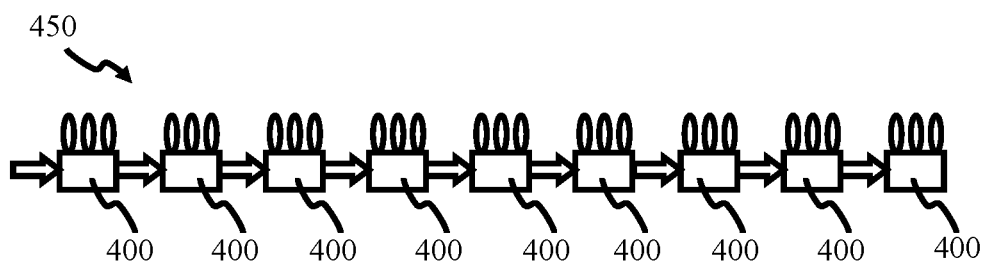

Accordingly, as shown in FIG. 4C, a plurality of such addressable LEDs 400 may be daisy-chained together to provide a array 450 of addressable LEDs controllable by a single driving signal.

Figure 4D:
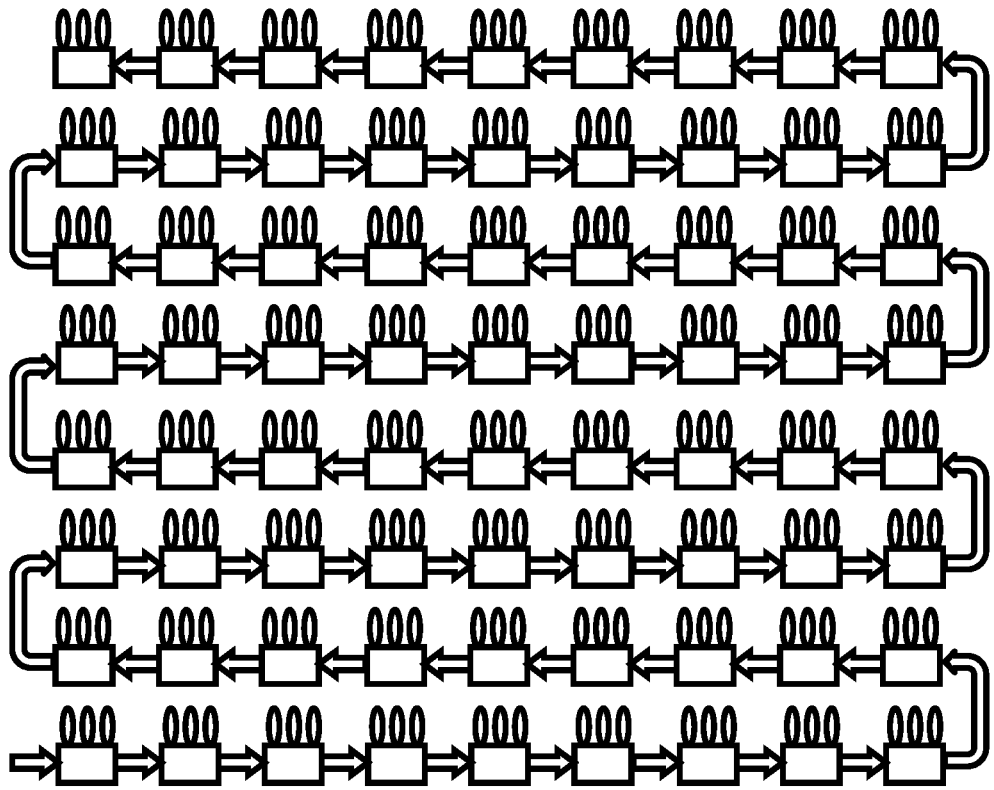

It is particularly noted that addressable LEDs may be configured into a two dimensional array 460, for example, by connecting adjacent rows as shown in FIG. 4D. In certain aspects of the disclosure the visual display surface of the interactive surface described hereinabove may incorporated a two dimensional array of addressable LEDs.

It is still another feature of the current invention that, where addressable LEDS are further operable to sense their environment, the bidirectional communication may be enabled along the daisy chain.

Figure 5A:
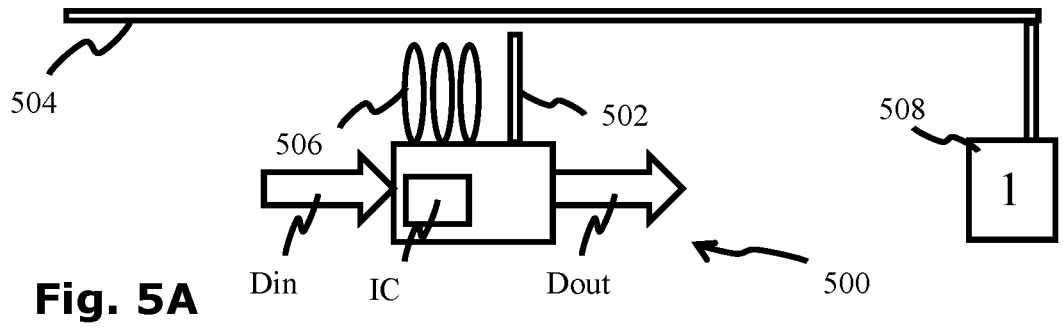
FIGS. 5A-D schematically represent an addressable pressure sensing unit which may be incorporated into a touch sensitive surface.

It is according to another aspect of the invention to introduce an addressable pressure sensing unit 500. With reference now to FIG. 5A, the addressable pressure sensing unit may include a contact sensor 502, an integrated circuit IC, a data-in line Din and a data-out line Dout, optionally, the addressable pressure sensing may further include a set of addressable LEDs 506. The addressable pressure sensing unit 500 may be used in combination with a conducting surface 504 and a state detector 508 to sense pressure in its vicinity. The integrated circuit of the addressable pressure sensing unit is configured to receive digital signals via the data-in line including a first data package including operating instructions for the contact sensor 502, and a second data package for transferring via the Dout line. Where required, the first data package may include multiple channels, for example four channels, one channel for controlling the contact sensor 502 and three further channels providing operating instructions for each of three LEDs.

As indicated in FIG. 5A, the contact sensor 502 is not normally in conductive contact with the conducting surface 504. In this state, the state detector 508, which is in contact with the conducting surface 504, indicates a default logic state of 1.

Figure 5B:
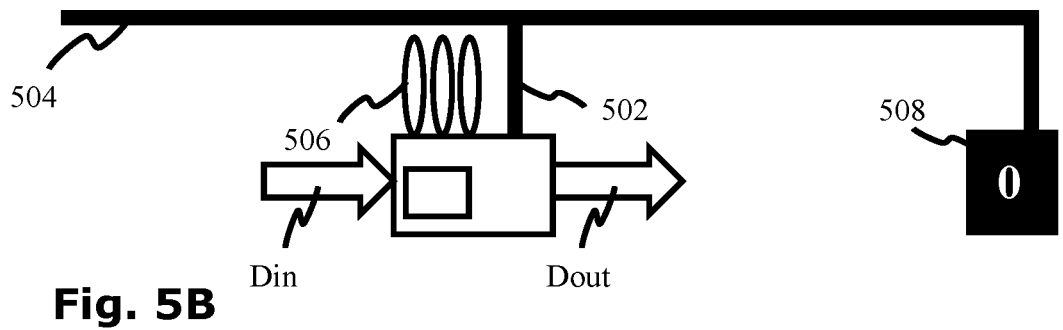

In order to switch the state of the state detector 508 to a logic state of 0, two conditions need to be met, as indicated in FIG. 5B:

1. The contact sensor 502 is activated to a logic state 0 (as indicated by a black shading).
2. The contact sensor 502 is in contact with the conducting surface.

In such as configuration, when both these conditions are met, the state detector 608 is drawn to logic state 0 thereby indicating that contact has been established between the activated contact sensor 502 and the conducting surface 504.

Figure 5C:
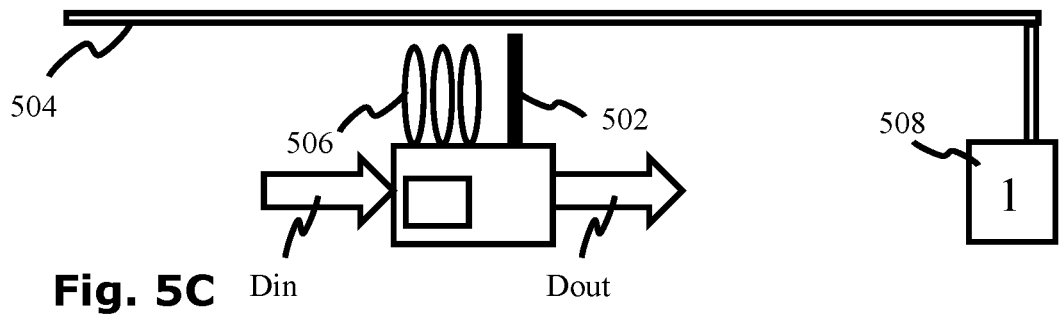
Figure 5D:
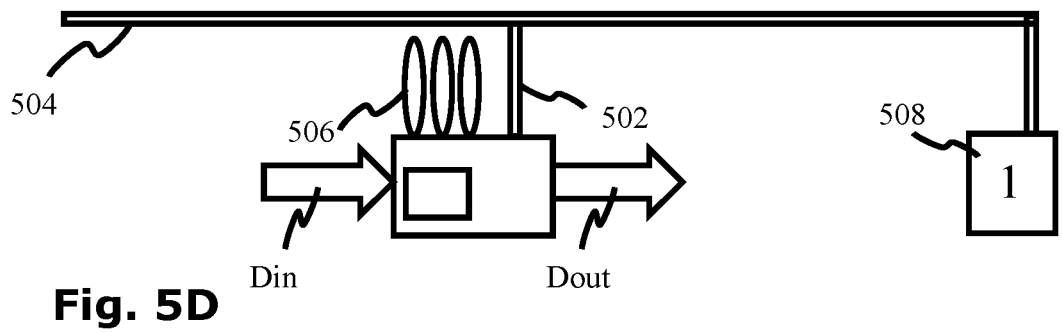

FIG. 5C illustrates that when the contact sensor 502 is activated but not in contact with the conducting surface 504, the state detector 508 remains at the default logic state 1. FIG. 5D illustrates that when the contact sensor 502 is not activated even if it is in contact with the conducting surface 504, the state detector 508 remains at the default logic state 1.

Although only a default logic state of 1 is described herein, it is noted that a default logic state of 0 may be preferred with the active contact sensor being held at a logic state 0. Still other examples the logic states may take non binary values, for example, the contact sensor 502 may be activated to other specific/unique voltage levels, either constant or time variable (AC, PWM . . . ) that can be detect by state detector 508.

Accordingly, the addressable pressure sensing unit 500 may be used to detect local pressure applied to the conducting surface 504 when the contact sensor 502 is activated.

Figure 6A:
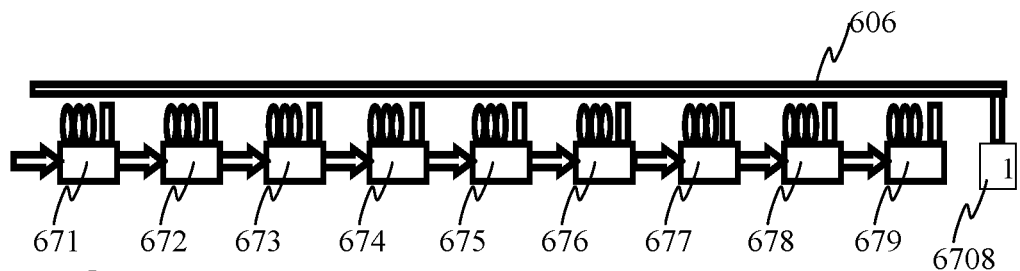
FIGS. 6A-E schematically represent how such addressable pressure sensing unit may be used to detect localized pressure.

Referring now to FIG. 6A, it is noted that multiple addressable pressure sensing units 671-679 may be daisy chained to provide a touch sensitive surface 600. The touch sensitive surface 600 includes an array of multiple addressable pressure sensing units 671-679, a common conducting surface 606 and a common state detector 608.

It will be appreciated that when none of the pressure sensing units 671-679 is in contact with the common conductive surface 606, the common state detector 608 remains at the default logic state 1.

Figure 6B:
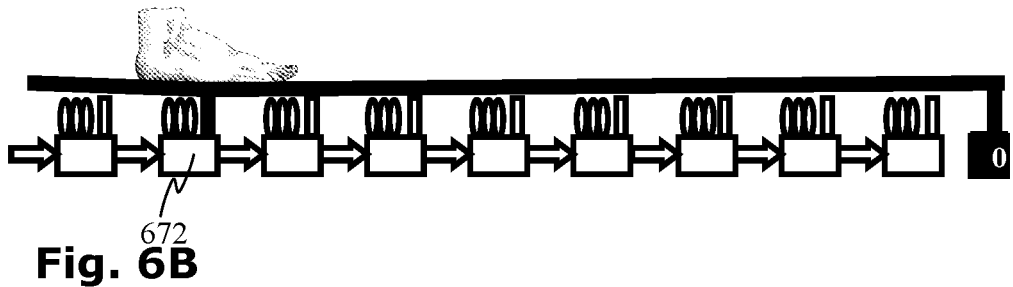
Figure 6C:
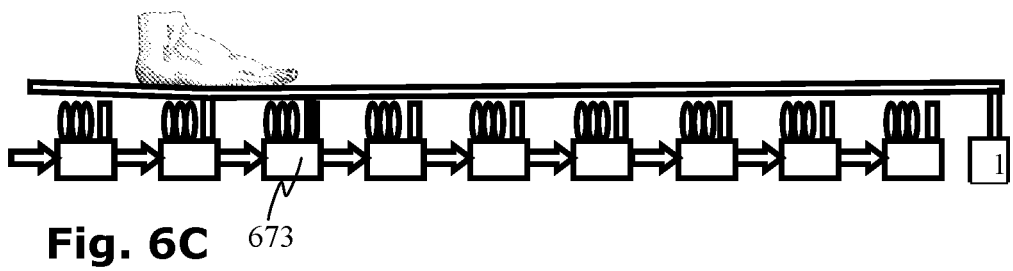
Figure 6D:
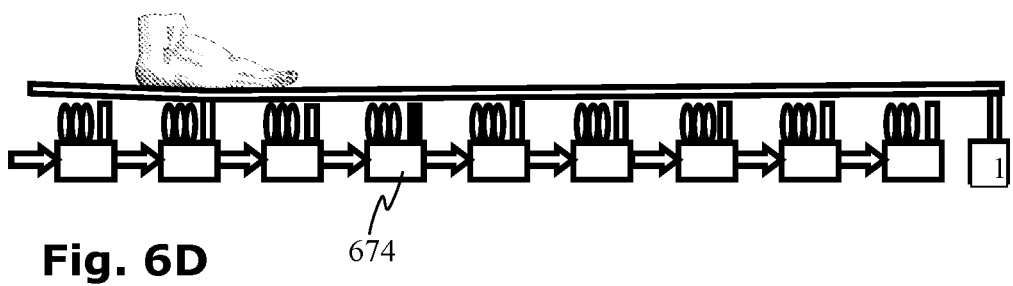
Figure 6E:
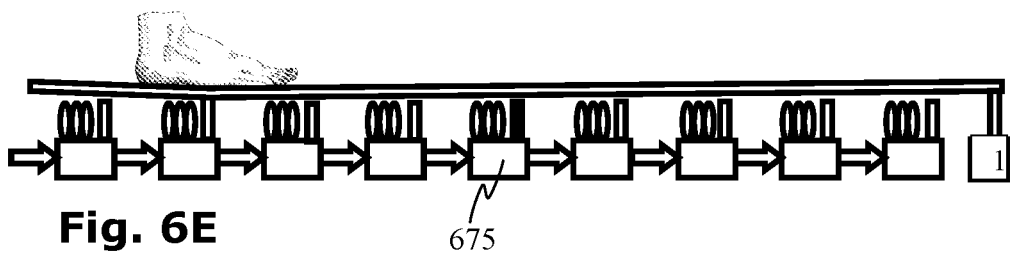

However, when pressure is applied to the pressure sensing surface 600, for example by a foot, an impacting ball, or the like, the conducting surface 606 may make contact with at least one of the pressure sensing units 671-679. Accordingly, as shown in FIG. 6B, when the contacting pressure sensing unit 672 is activated, the state detector may be drawn to logic state 0.

The location of the pressure applied on the mat may be determined by providing a timed pulse sequentially activating each pressure sensing unit 671-679 as illustrated in FIGS. 6B, 6C, 6D, 6E, in which adjacent pressure sensing units 672, 673, 674, 675 are activated one after the other. It is particularly noted that because none of pressure sensing units 673, 674, 675 are in contact with the conducting surface 606, during this sequence, the state detector is only drawn to logic state 0 when the pressure sensing unit 672 is activated.

Thus if the timing sequence of the activation of each pressure sensor is known, the location of the pressure upon the pressure sensing surface 600 may be inferred from the timing of the logic state determined by the state detector 608.

By so daisy chaining a plurality of addressable pressure sensing units which include LEDs, it is particularly noted that a single input signal may be used to provide both display and detection channels, thereby integrating touch sensitive capability to any addressable LED display.

Although only a digital signal is described above for the sake of clarity, it is further noted that an analogue signal may also be provided which, in combination with capacitive sensors may provide an addressable proximity sensor along similar lines.

It is still another feature of the current invention that where addressable LEDS are further operable to sense their environment the bidirectional communication may be enabled along the daisy chain.

Figure 7A:
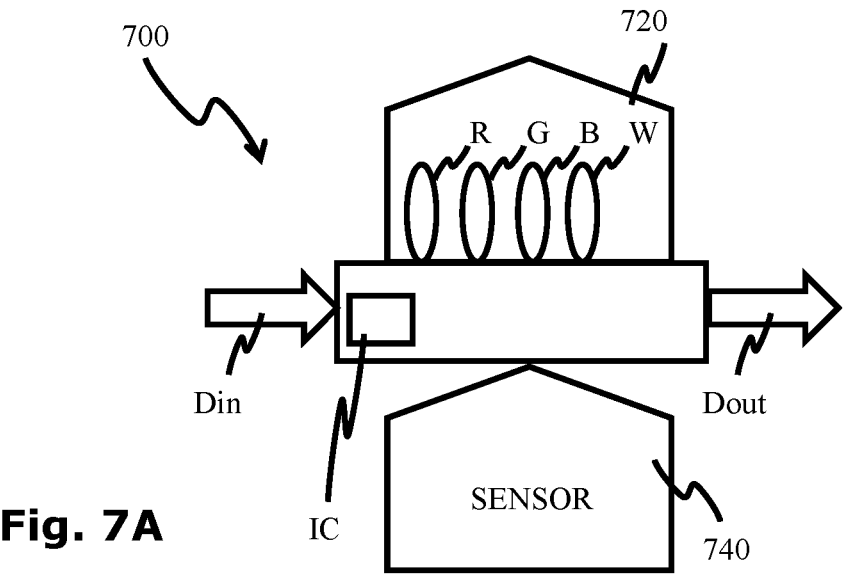
FIG. 7A schematically represents possible addressable environment interface pixel including environmental input and output interfaces.

Reference is now made to FIG. 7A which illustrates a possible addressable environment interface pixel 700 which includes an integrated circuit IC, environmental output interface 720, such as an addressable LED array, for example, an environmental input sensing unit 740, a digital data input $D_{in}$ and a digital data output $D_{out}$.

The environmental output interface 720 is configured to present an output signal according to digital data received via the digital data input line $D_{in}$. The environmental input sensing unit 740 is configured to generate a digital output according to environmental conditional sensed thereby.

The environmental output interfaces 720 may be daisy chained into a sensing array 710 and controlled by a controller 730 configured to provide an input data signal to the first pixel in the array and to receive the output data from the last pixel in the array. In still further examples data may be shareable between the integrated circuits of individual pixels without the controller providing direct control.

It is noted that the environmental input sensing unit 740 may include a number of sensors, such as light sensors, proximity sensors, pressure sensors, temperature sensors or the like, thereby allowing a variety of environmental conditions to be monitored by the pixels. Where all the pixels in an array 710 are environment interface pixels 700, the resolution of the sensing may be as high as that of the environment interface pixels 700 in the array. Additionally or alternatively different environment interface pixels may be configured to sense different environmental conditions, decreasing the sensing resolution but increasing the range of environmental conditions to be sensed.

It is further noted that sets of pixels may operate in combination such that, for example, the direction of movement of a nearby object may be detected by combining the sensing data received by adjacent sensors.

Figure 7B:
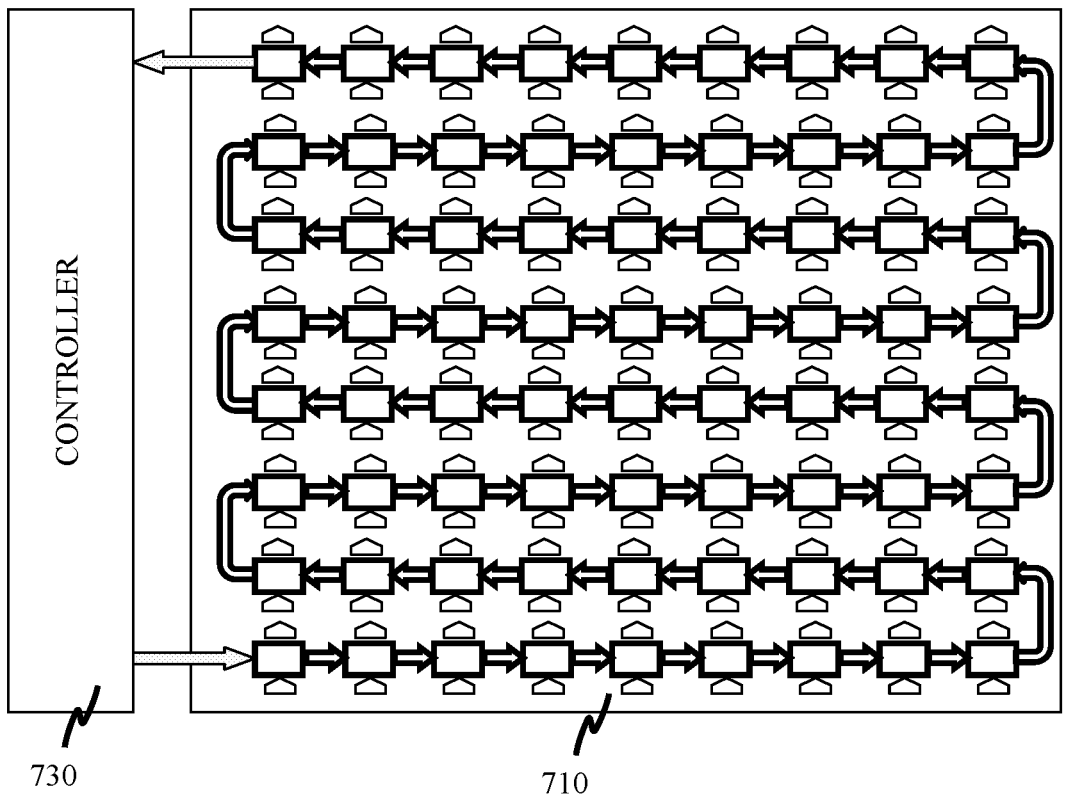
FIG. 7B schematically represents a possible array of addressable environment interface pixel.
Figure 7C:
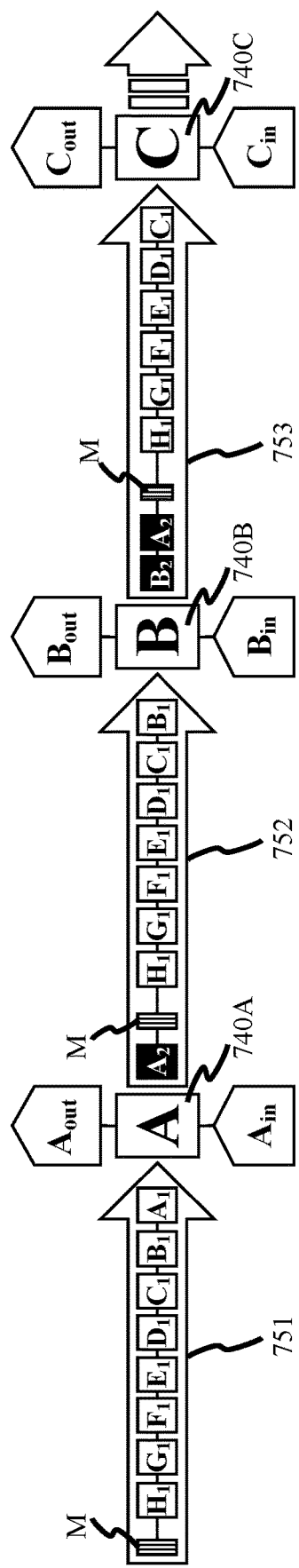
FIG. 7C schematically represents illustrates a possible bi-directional data protocol.

Reference is now made to FIG. 7C which illustrates a possible bi-directional data protocol. An array 710 of environmental interface pixels 740A-C may receive a first input data signal 751 comprising a string of input message packets $A_1$, $B_1$, $C_1$, $D_1$, $E_1$, $F_1$, $G_1$, $H_1$ etc . . . possibly followed by a marker M indicating the end of the input message packets. The first environmental interface pixel 740A receives the first input data signal 751. Upon receiving the input data signal 751 the first environmental interface pixel 740A is operable to execute instructions coded in the first input message packet $A_1$. This packet, for example, may determine the output of the first environmental output interface $A_{out}$. The first environmental interface pixel 740A is further operable to generate a digital output signal 752 which is passed to the second environmental interface pixel 740B.

It is noted that the output signal 752 does not include the input message packet $A_1$ executed by the first environmental interface pixel 740A. Accordingly, the first input packet $B_1$ received by the second environmental interface pixel 740B is the second packet of the original data string 651. The second environmental interface pixel 740B is configured to execute the first packet $B_1$ which it receives and to generate a new digital output signal 753 which is passed to the third environmental interface pixel 740C. The process may be repeated along the chain, each time shortening the head of the data string, until all the environmental interface pixels in the array 710 have executed their instructions.

It is a particular feature of the embodiment that each environmental interface pixel 740A, 740B, 740C further includes an environmental input sensing unit $A_{in}$, $B_{in}$, $C_{in}$. Accordingly, the first environmental interface pixel 740A is operable to append an output data packet $A_2$ to the generated output signal 752. The output data packet $A_2$ may be used to transmit data from the pixel's environment sensing unit. The data may be received by the controller 730 (FIG. 7B) or alternatively in certain embodiments may be read by other environmental interface pixels downstream from it.

Similarly the second environmental interface pixel 740B is operable to append an output data packet $B_2$ to its generated output signal 753 thereby lengthening the tail of the data string. The process may repeat along the chain of pixels in the array 710 thereby generating an output string which may be received by the controller 730 (FIG. 7B).

Such an array 710 of environmental interface pixels may be used in a number of applications. By way of example, the brightness of each pixel may be adjusted according to the light level incident thereupon. Brightness adjustment having a pixel resolution may be used to compensate for partial shading of advertising hoardings, sports stadium displays and the like as well as for use in personal screens.

Figure 8:
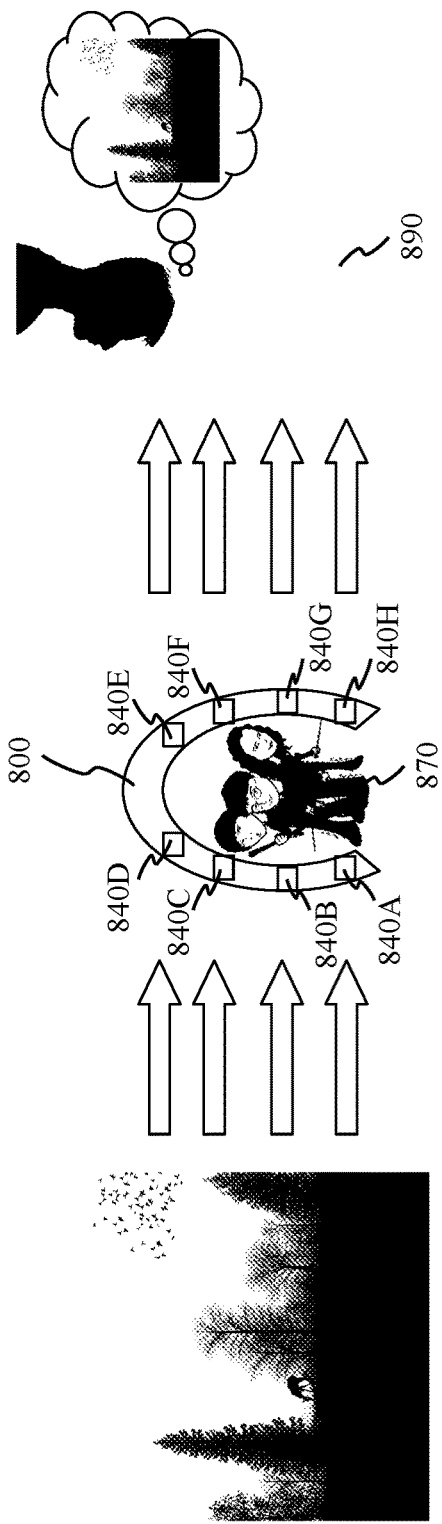
FIG. 8 schematically represent a cloaking device incorporating an array of addressable environment interface pixel.

Another application of the embodiment is indicated in FIG. 8. An array 810 of environmental interface pixels may be incorporated into a cloaking device 800 for rendering objects 870 invisible.

The array 810 may be configured to sense the color and intensity of light incident on each pixel 840A, 840B, 840C, 840D. Accordingly, this data may be communicated to corresponding diametrically opposed pixels on the other side of the cloaking device 850 either directly or via a controller. The diametrically opposed pixels 840H, 840G, 840F, 840E may receive instructions to emit light at the same intensity and color such that the cloaking device 800 and any objects 870 concealed thereby are rendered invisible to an observer 890.

Figure 9A:
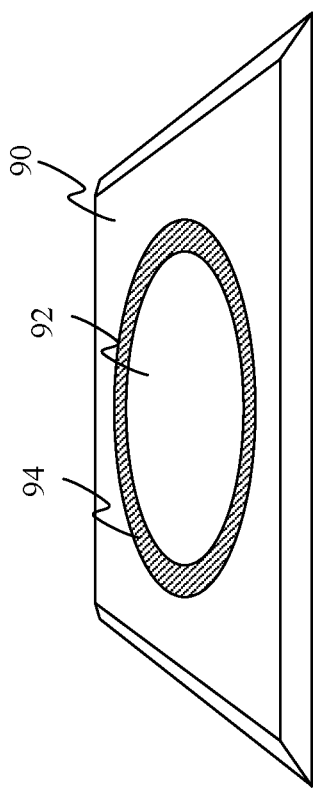
FIGS. 9A and 9B illustrate possible layouts of the visual display surface for use in an interactive game according to certain embodiments.

Referring not to FIG. 9A, in another aspect the system 90 may be used to present a play area 92 within which multiple players play a game in which at least one user attempts to move at least one other player into or out of a defined area. Accordingly the defined area 92 may be indicated by a colored region, a border line 94 or the like. Where appropriate the region may encompass the whole sensing surface, in other examples the region may itself be moving around the sensing surface.

Figure 9B:
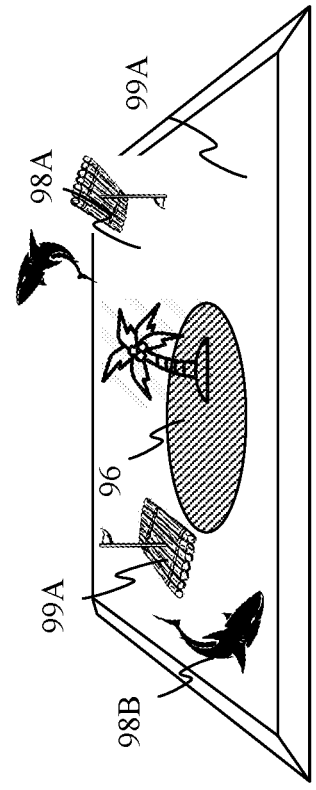
Figure 10A:
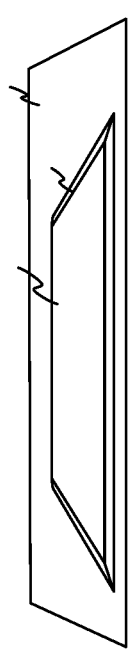
FIGS. 10A-C are schematic representations of examples of interactive visual display surfaces including a margin configured to appear continuous with the surrounding flooring.
Figure 10B:
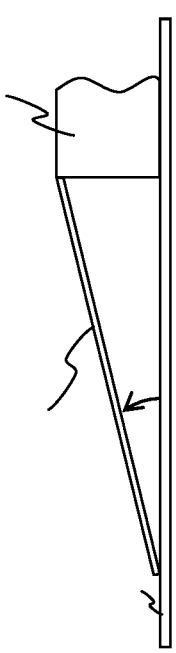
Figure 10C:
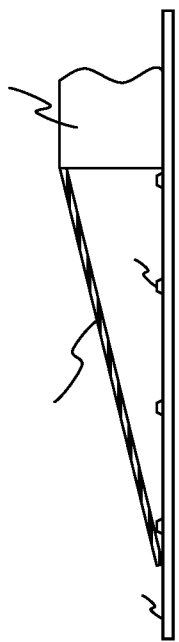

For example the defined area may be represented as a simulated roof top for example, and the players attempt to push each other off the roof top. Alternatively or additionally, the players may attempt to push each other into moving targets, perhaps, as illustrated in FIG. 9B, from a simulated island 96 towards simulated sharks 98A, 98B or onto simulated rafts 99A, 99B or the like. Still other examples of game scenarios will occur to those skilled in the art.

The sensing system may be operable to detect the user's movements upon the surface and thereby detect when a user steps into the defined area. Various methods may be used by the system to successfully identify which user is which when pressure is detected upon the surface. Where appropriate, a dedicated accessory, for example a shoe or the like, may be provided which the sensing surface may detect and associate with a particular user. Alternatively or additionally the sensing surface may track each pair of feet in a continuous manner such that the identity of the user is apparent.

FIG. 3A shows a further embodiment of the interactive visual display 80 including a margin 82 comprising a skirt perimeter configured to appear continuous with the surrounding flooring 81.

It will be appreciated that the upper surface of the interactive display 80 is generally raised at least slightly above the level of the flooring 81. For example in certain embodiments a display may have a thickness within the range of 0.5 to 5 centimeters, typically around 2 centimeters or so.

It is a particular feature of certain embodiments that a tapering skirt 82 may provided around the perimeter of the surface. The skirt 82 may be selected so as to taper so as to reach the plane of floor 81 at an acute angle θ of between say 30-45 degrees.

Where appropriate, the skirting 82 may be selected to match the color, pattern or material of the surface of the flooring 81. Accordingly, the skirting may be retrofittable or exchangeable between display surfaces 80 to suit the flooring upon which the surface is mounted.

Referring now to FIG. 3B, showing a profile a of a particular embodiment of the skirt margin, the margin may include a reflective surface layer 84. The angle θ maybe selected such that the reflective surface 84 might reflect the surface of the surrounding floor 81 towards the eyes of a viewer situated above. In other embodiments, the skirting may be transparent thereby transmitting the color of the flooring situated therebelow.

Referring now to FIG. 3C, an active system may be provided in which at least one image capture device 88 on the underside of the skirting is enabled to detect the appearance the flooring therebelow and to transmit this appearance to an active display 86, such as an array of LEDs or the like, situated along the upper surface of the skirting. Accordingly the upper surface of the skirting may adopt the appearance of the underlying floor 81.

In one suggested interactive game, a user may be prompted to "catch" the right moving color across the platform. The platform's screen displays moving colors and the user is required to jump onto specific colored regions. When the player steps on the designated color, the colored may be added to a bar at the side of the platform and the game may be completed when the board is filled with the right color. However if the user misses the color a penalty color may be added to the other side. The speed and game time may be set to suit the skill level of the participant.

In another example, a game may be provided where users need to put out areas that "catch fire" right under their feet. The playground is divided into movable units (squares), some are set on fire by turning red or other color and shape. Once the player jumps over on a fire square, the fire is extinguished. If he hits the fire he is burned. An uncontrolled fire (a fire square that was not been extinguished on time) will cause adjacent squares to set on fire. The fire spreads out at various speeds, depending on game level. One may win the game by putting out all the fires.

In other example, a timing game may be provided where jumping on a changing number, shape or color at just the right moment is key. In the center of the playground a number may appear. The number may change rapidly, and the player may be required to jump on the number at the right moment to catch it. A goal may be to complete a series of numbers in a specific order. The player that fills a series in the bottom of the board wins the game. Additionally or alternatively, color or shapes may be used instead of or in combination with numbers.

Other games include dominos, tick-tack-toe, snake, hopscotch or the like, in which hopscotch lines are drawn on the master tile with 90 degrees curves, along the sides, anticlockwise. The squares of the hopscotch change all the time. They become narrow and wide, small and big. Slow or fast. The player must hop accordingly. In another version of hopscotch, the player jumps on numbered squares that appear under his feet, in various sizes and tempo. Mistakes bring the player to the beginning. There are many levels of the game.

It will be appreciated that where multiple modules are available the game may be extended accordingly.

In one multiplayer game a user is encouraged to express their emotions towards other members. Each player participates in a group. One may belong to many groups. When a user wants other remote players to play with him, his name appears on their playgrounds. The name moves all over the playground, appears and disappears When one of the members manages to step with both feet on the name—connection occurs, and a mutual game starts. The tempo of the name on the playground is up to the name's owner. So a user may select some names to move more slowly than others so that it is easier to contact those users.

Hopping games may be played using the edges of the master tile or alternatively, using multiple tiles. For example, on the four corners of the master tile hop spots are marked. The user must hop from one spot to another, clockwise. The higher and faster one hops, more colored squares fill lines in the big inner empty square. The more good hops are done, more colored lines fill the space. Mistakes, bad landings, slow or too low hops make some of the already achieved lines to disappeared.

Various applications are considered which may use the interactive system described herein.

A first application is a game known as "ROACHMIMATOR" in which a user stands on the interactive system upon which targets, typically simulated cockroaches, appear randomly upon the surface.

The targets may be of differing sizes and shapes and may move, or make noises as required. Typically, at the start, small slow cockroaches are simulated which grow progressively bigger, faster, and possibly more disgusting over time.

If the user jumps away from them far enough, they may freeze, but only for a while. The aim for the user is to destroy the cockroaches by smashing them under the foot. The bigger they become, the harder it gets. A simple foot step on a cockroach is not lethal for the medium size and big ones. For those, the player must hop high into the air in order to gain enough smashing force. (It is noted that this may be determined by the sensing apparatus detecting the user disconnecting with the surface for a period). The bigger the cockroach is, the higher the player must jump (detectable, for example, by the duration of the disconnection). When a cockroach dies it may makes disgusting death cry.

If the player fails to terminate the cockroaches, they fill the playground with their ugly noises, hectic crawling, and disbudding jesters. The game ends when all cockroaches are lying down on their backs, dying, and waive their feet in the air. Such a game may have a variety of difficulty levels.

A second application is a game being played with a designated ball. Two players that my standing out of the playground, on opposite sides. Alternatively or additionally, a single play may play against a vertical surface.

The purpose of the game is to hit a moving target with the ball, accurately, within a limit of time. The target appears randomly, in unexpected spots on the playground.

The size of the target, as well as its moving speed, may be selected according to the player ongoing achievements. If the user hits the target, it may become bigger for his next throw. If he misses, the target shrinks for his next one, it may move faster, and be located in a harder place to hit.

It is further noted that, where required, the ball itself may itself include a display, and may incorporate a communicator such as a Bluetooth bi-directional communicator or the like, and perhaps a controller allowing it to communicate with the playground system. Such balls may further comprise other sensors such as pressure sensors, position sensors and the like. Accordingly, the color of the ball may be adjusted for example by internal LEDS when a user hits a specific target perhaps having the same color on the playground. Optionally the color may change again after a period of time or as a result of further actions.

Additionally or alternatively, if the player hits the target, the rival may get a smaller target for the rival's next throw. The locations of the targets change randomly, but the better you play, the more convenient for you they may become.

The aim may be hitting the target as well as disqualifying the rival catcher. Accordingly, the slower the rival catches the ball and throws back his shot, the smaller the rival's target becomes.

A set may end when a player misses a certain number of times, say three for example. A game may include a certain number of set, say six for example.

A third application includes another game in which a dedicated interactive disc may be provided which may be kicked or thrown into a target or goal. Optionally, each player may allowed only one kick at a time. The surface may interact according to the kicks of the players. It is noted that the disc may include a communicator and a display which interacts with the surface according to its position and the context of the game.

Another application includes the incorporation of the sensing surface into a trampoline surface such that challenges may be presented to users jumping on the trampoline.

Another application includes another game in which a simulated skateboard, snowboard, hoverboard, waterski or the like, is generated on the sensing surface. The two ends of the board may detect the pressure exerted by the ball and the heel of each foot of the user.

Where required an interactive physical skateboard accessory may be provided that will physically may simulate the user movements and will move upon pressure. The accessory may have bi-directional communication with the playground and the playground will react upon user movement on the board itself. The physical board accessory may incorporate a communicator such as a Bluetooth bi-directional communicator or the like, a controller as well as other sensors such as pressure sensors, position sensors and the like.

Alternatively, a virtual skateboard may be preferred which may be operable to change virtual position and virtual direction as required such that the front foot and the back foot may be reversed as required.

Various views may be displayed by the surface moving backwards to simulate a track such as corridors, ramps, bends, tunnels, channels, bridges, snow banks etc.

Twists and turns of the course may require a user to jump or apply pressure differently as required (all detectable by the sensing surface). All such movements will influence the movement of the simulated skateboard.

It is further noted that movement may be further simulated by the inclusion of interactive vibrating elements incorporated into the surface.

The illusion of movement may result from any combination of the following: the shape of the simulated board, positioning of pressure sensors, movement of the displayed background image, vibrators within the surface, touch sensors identifying location of the user, height sensors (possibly by detecting jump times) and sound effects.

In still another application, a parkour simulator may be generated in which an urban environment is presented by the display. The user may be prompted to jump from simulated rooftop to simulated rooftop. The roof tops may become lower and lower in the simulation until the user reaches street level.

It is particularly noted that, in contrast to other virtual reality applications in which jumps in the real world may be interpreted as similar jumps in the virtual world, according to this application, although the user jumps upwards in the real world, this this upward jump is represented in the virtual world as a downward fall.

The surface may detect the strength of the push or the time that the user is disconnected from the surface in order to determine whether the target roof has been reached or whether the user "falls to the ground". A fall may be accompanied by suitable sound effects or vibrations as required.

Once arriving at street level, the user may be prompted to continue descending into a subway system possibly including moving steps or escalators. The rate at which the user descends would be determined by the height of each jump as recorded by the detecting surface.

Although only an urban environment is described above, the background could be a cliff face, in which the user jumps down for cliff to cliff or from ledge to ledge or the like. In still other examples a user may jump on a ship's rigging, between aircraft, spacecraft or any such environment as required.

In still another example, a long jump simulator may involve a jump line accessory which may incorporate a communicator such as a Bluetooth bi-directional communicator or the like, a controller as well as other sensors such as pressure sensors, position sensors and the like. Accordingly, a bi-directional communication channel between the jump line accessory and the playground, may enable the jump distance or the like to be measured.

The system may further be integrated into a sensing display platform for use in a variety of applications. For example, an infant activity mat (baby gym or baby university) may integrate the system described hereinabove in a play area including an interactive base and interactive overhanging arches. The base and arches may comprise LED displays and pressure sensors, operated by the smartphone. Furthermore an actively monitor may detect, measure, record and provide parents information about the baby movements, and activities. It will be appreciated that such an infant development platform may further involve a lot of add-ons and accessories, despots are sent to the parents account A juvenile activity center may also incorporate a system such as described herein as a play area used to provide activities to children, for example between ages—3-7, interactive accessories and various games may be operated by a smartphone, to collect information to track and monitor kids activates and interactions.

In still other applications, a system such as described herein may communicate with a SmartTV, a games console, Play Station, Xbox, personal computer or the like. The System may serve a variety of functions such as an interactive Smart controller—a play area may be used as a smart controller that will includes lights, pressure sensors, sounds and the ability to control games via the playground. In other examples the play area may extend a game area onto the floor with the games extended onto a playground, which will display games elements as well as sense responses to the player movements on the playground.

In particular a smart playground game hub may be provided for operating systems such as Android, which uses the playground to play any compatible playground game for example downloaded from the Google PlayStore, which may be downloaded via the a dedicated Game Center and played on the ground using the playground.

In other applications, the systems may incorporated into portable Outdoor playgrounds. Accordingly the interactive platform may include a power pack allowing the unit to be used outside the home environment, for example for kids to play various games, operated by a mobile computing and communication device such as a smartphone.

Another important application of the sensing system is for use in personal health. For example, the system maybe integrated as a Personal Sport Trainer. Accordingly the platform may execute personal Sport training programs, combined with pressure sensors, collect user activities, achievements and movements, together with music and management via the smartphone In other aspects the system may serve as a playground Therapeutic Center. Here, the play area may be used for Therapeutic and Physiotherapy purposes, combined with pressure sensors, operated by the smart phone, all patient movements, progress and activities may be monitored and optionally reported automatically and remotely to a carer such as a doctor or therapist, to measure, monitor and record patient activities.

In other examples, an interactive flooring may be used to provide on-premise customer tracking and guidance. The system is integrated into the flooring to count the number of customers coming into the press, provide direction, advertisement, customer responses. A store may install an interconnected network of sensitive flooring which may communicate and monitor the movements of people, possibly counting the numbers coming in and going out, and collecting statistics regarding customer behaviours, and the like.

Selected additional or alternative features of the system include:

A ball extension operable to change color and/or to emit a sound upon impact with a target.

A restart mechanism operable in which the system may be shutdown and when reactivated returns to the former state.

An orientation mechanism for orientating the display according to the point of contact when a user stands on the platform.

A trigger mechanism operable to activate the system when the system senses that a user has stepped upon or stepped of the platform.

A navigation bar feature which may be integrated into the surface or margin area of the platform and which may be activated when the system senses that a user has stepped upon or stepped of the platform.

A fitness monitor mechanism operable to measure activity such as, number of press-ups, steps, sit-ups, skips, height of jumps (possibly using the formula $h=0.5 g(\Delta t/2)^2$ where $\Delta t$ is the time between launch and impact and g is the acceleration due to freefall) or the like. Optionally feedback may be provided by color changes, sounds emitted or the like on the mat.

A floor hugging power cable configured to provide power (for example 12V DC) to the platform. The floor hugging power cable may have an insulating jacket having a cross-section truncated by a flat underside which may grip the floor, possibly using vacuum suction, adhesive or the like.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like intended to include all such new technologies a priori.

As used herein the term "about" refers to at least ±10%. The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of."

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6, should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A modular interactive visual display platform comprising at least one tile module, and at least one power module, wherein:
  said at least one tile module comprises:
    at least one visual display sensing surface comprising a display mechanism and a sensing mechanism, said display mechanism operable to generate and to display graphical images and said sensing mechanism operable to sense at least one parameter associated with at least one object proximate to said surface; and
    at least one tile connector interface comprising a tricoupling mechanism comprising a mechanical connector, a power connector and a communication connector for coupling said tile connector to a corresponding tricoupling mechanism of at least one other module; and
  said at least one power module comprises:
    at least one power supply connector for connecting to an external power source; and
    at least one tile connector terminal comprising at least a power connector for coupling with a corresponding power connector of a tricoupling mechanism of another module;
  wherein said at least one visual display sensing surface comprises an array of proximity sensors, said proximity sensors comprising at least one integrated circuit, at least one red light emitting diode, at least one green light emitting diode, at least one blue light emitting diode, and at least one infra-red sensitive phototransistor, wherein said at least one infra-red sensitive phototransistor is operable to detect IR radiation reflected thereupon by objects proximate thereto; and
  wherein said at least one red light emitting diode is selected to have a frequency emission range extending into the infra-red spectrum and operable to emit IR radiation detectable by said at least one infra-red sensitive phototransistor.

2. A modular interactive visual display platform comprising at least one tile module, and at least one power module, wherein:
  said at least one tile module comprises:
    at least one visual display sensing surface comprising a display mechanism and a sensing mechanism, said display mechanism operable to generate and to display graphical images and said sensing mechanism operable to sense at least one parameter associated with at least one object proximate to said surface; and
    at least one tile connector interface comprising a tricoupling mechanism comprising a mechanical connector, a power connector and a communication connector for coupling said tile connector to a corresponding tricoupling mechanism of at least one other module; and
  said at least one power module comprises:
    at least one power supply connector for connecting to an external power source; and
    at least one tile connector terminal comprising at least a power connector for coupling with a corresponding power connector of a tricoupling mechanism of another module;
  wherein said at least one visual display sensing surface comprises a conducting surface, a state detector, and an array of addressable pressure sensing units,
    wherein:
      each addressable pressure sensing unit comprises an addressable LED, an integrated circuit, a data-in line, a data-out line, and a contact sensor switchable between logic state ZERO to logic state ONE;
      said conducting surface is configured to make conductive contact with a contact sensor only when pressure is applied thereto;
      said integrated circuit is configured to receive digital signals via the data-in line including a first data package including operating instructions for the contact sensor, and a second data package for transferring via the data-out line; and
      said state detector is operable to detect a change from state ZERO to state ONE when an addressable contact sensor is both activated to logic state ZERO and is in contact with said conducting surface;
      such that said state detector is operable to detect local pressure applied to the conductive surface in the region of an activated contact sensor.

3. A method for providing an interactive visual display sensing platform, said method comprising:
  obtaining at least two tile modules, each comprising a display mechanism and a sensing mechanism and at least one tile connector interface;
  obtaining at least one connector module comprising at least two tile connector interface, a power bridge, and a communication bridge;
  connecting said at least two tile modules via said at least one connector module comprising a communication bridge;
  a central processing unit generating a graphical display control signal;
  communicating said graphical display control signal to at least one said display mechanism via said communication bridge of said connector module;
  said at least one said display mechanism displaying graphical images according to said graphical display control signal;
  at least one said sensing mechanism sensing at least one parameter associated with at least one object proximate to said surface; and
  communicating said at least one parameter sensed by said at least one said sensing mechanism said via said communication bridge of said connector module to said central processing unit;
  wherein said sensing mechanism comprises a conducting surface, a state detector in conductive contact with said conducting surface, and an array of addressable pressure sensing units, and the step of at least one said sensing mechanism sensing at least one parameter comprises:
    setting at least one addressable sensing units to a logic state ZERO at a known time;

said conducting surface contacting said at least one addressable sensing units; and said state detector detecting state ZERO at said known time.

* * * * *